United States Patent [19]
Cain et al.

[11] Patent Number: 5,659,000
[45] Date of Patent: Aug. 19, 1997

[54] LOW FAT EMULSION PROCESS

[75] Inventors: Frederick William Cain, Voorburg; Leendert Hendrik Wesdorp, Vlaardingen, both of Netherlands; Gina Suzette Hutson, Baltimore, Md.

[73] Assignee: Van den Bergh Foods Co., Division of Conopco, Inc., Lisle, Ill.

[21] Appl. No.: 673,786

[22] Filed: Jun. 11, 1996

Related U.S. Application Data

[63] Continuation of Ser. No. 443,828, May 18, 1995, abandoned, which is a continuation of Ser. No. 212,482, Mar. 14, 1994, abandoned.

[51] Int. Cl.$^6$ .................. A23G 3/00; A23D 7/06
[52] U.S. Cl. ............ 426/602; 426/604; 426/660
[58] Field of Search .................. 426/602, 660, 426/604

[56] References Cited

U.S. PATENT DOCUMENTS

| | | |
|---|---|---|
| 5,104,680 | 4/1992 | Padley et al. |
| 5,192,568 | 3/1993 | Yokoyama ............... 426/602 |
| 5,196,215 | 3/1993 | Yokoyama ............... 426/602 |
| 5,217,742 | 6/1993 | Jones ...................... 426/602 |
| 5,244,688 | 9/1993 | Norton .................... 426/602 |
| 5,294,455 | 3/1994 | O'Brien ................... 426/604 |
| 5,336,514 | 8/1994 | Jones ...................... 426/602 |
| 5,340,600 | 8/1994 | Reckweg ................. 426/602 |
| 5,352,474 | 10/1994 | Lammers ................ 426/602 |
| 5,409,719 | 4/1995 | Cain ........................ 426/103 |

FOREIGN PATENT DOCUMENTS 0 547 658   6/1993   European Pat. Off.

*Primary Examiner*—Carolyn Paden
*Attorney, Agent, or Firm*—Cushman Darby & Cushman IP Group of Pillsbury Madison & Sutro LLP

[57] ABSTRACT

A water continuous fat emulsion is formed from 10–30 wt %. fat, 5–57 wt % water, 13–85 wt % of one of an acidity regulator, thickener, bulking agent, emulsifier, sweetener, flavor, colorant, humectant or preservative by mixing the components at a temperature above the melting point of the fat. Then the emulsion is cooled at a shear of 30–1500 s$^{-1}$ for less than two minutes while phase inversion occurs.

11 Claims, No Drawings

LOW FAT EMULSION PROCESS

This is a continuation application of Ser. No. 08/443,828, filed May 18, 1995, now abandoned, which is a continuation of Ser. No. 08/212,482, filed Mar. 14, 1994, now abandoned.

BACKGROUND OF THE INVENTION

In our European Patent Application 547,658 we have disclosed low-calorie confectionery filling compositions comprising a fat-continuous emulsion having a fat content of 5–50 wt. %, while the water content of the remainder is 10–60 wt. %, the remainder further consisting of at least one of the following compounds acidity regulator (controller), thickener, bulking agent, emulsifier, sweetener, flavour, colorant, humectant and preservative.

According to this document, the above-mentioned compositions are prepared by making a pro-mix at 60° C. ncy waves with reduced feedback androtator C unit and then through a total of five Votator A units, the flow rate applied being 25 g/min. and the process temperatures being 39° C., 5° C., 6° C., 9° C. and 20° C. (of. Example 1 of EP 547,658). Another method of preparation is disclosed in Example 5 of the above-mentioned EP 547,658. Another pre-mix was made but this time at 70° C. The pro-mix was passed through a C unit and then through two A units. The throughput was now 19 g/min. (filling c) or 8 g/min. (filling D). Exit temperatures were 50°, 8°, 16° C. for filling C and 50°, 14° and 21° C. for filling D. The above-mentioned processes are rather complicated and have a major disadvantage, i.e. the residence time of the emulsion in the system is too long (at least 2 minutes can be calculated from the data of EP 547,658); therefore, the emulsions are subjected to an inappropriate shear at an inappropriate temperature for too long a time. This results in the formation of emulsions having an acceptable product performance, however, this performance does not yet meet the high quality-standards required by the confectionery manufacturers.

SUMMARY OF THE INVENTION

We found that products having a better performance (in particular stability, more particular: stability upon spreading, oral mouthfeel, full fat like-sensation) can be obtained by performing the following process comprising the steps of:

(1) forming a water-continuous fat emulsion having the composition:

10–30 wt. % preferably 15°35 wt % of fat;

5–57 wt. % preferably 15–40 wt % of $H_2O$,

13–85 wt. % of remainder, being at least one compound from the group consisting of acidity regulator (controller), thickener, preferably a non-gelling thickener, bulking agent, emulsifier, sweetener, flavour, colorant, humectant and preservative, by mixing the components at a temperature above the melting point of the fat;

(2) cooling the emulsion, using a shear of 30–1500 $s^{-1}$, preferably 100–800 $s^{-1}$, applying a residence time of less than 2 minutes, preferably less than 1.5 minute, more preferably from 1–90 seconds, most preferably from 10–75 seconds, the residence time being defined as the time that the emulsion is subjected to cooling, using shear, while phase inversion occurs.

The shear being defined as:

$$\frac{\text{tipseed of knive}}{\text{annular gap}}$$

DETAILED DESCRIPTION OF THE INVENTION

The cooling step (2) is preferably carried out by using one or more A units. The conditions applied for the cooling in step (2) should be such that no more than 20 wt. % of α-phase fat is formed.

Step (1) is performed at a temperature above ambient, preferably between 35° and 85° C.

The fats that can be applied may be selected from a wide range of vegetable and animal fats. It is, however, preferred that the fat has a melting point between 35° and 75° C. In this way, the fat is present as a liquid in the pre-mix, facilitating the formation of the water-continuous emulsion. Preferred fats have a solid content at 200° C. of at least 17 (NMR pulse; not stabilized, of: EP 547,658 page 4, line 42).

Because of the fact that fats rich in behenic acid residues are believed to be low-calorie fats, we prefer the use of fats containing at least 15 wt. % of behenic acid preferred examples thereof are triglycerides rich in BUP and/or BUU (B=behenic, U=unsaturated fatty acid with at least 18 C=atoms, P=palmitic). These fats are described in our co-pending European Patent Application 94300631.2

The emulsions we make preferably contain:

15–25 wt. % of fat

15–40 wt. % of water balance remainder.

The above-mentioned process can be used in the preparation of low-fat emulsions for all kinds of food applications. However, very conveniently, low-calorie confectionery filling compositions are prepared by mixing of 10–30 parts of a vegetable fat selected or derived from soft fractions of cocoa butter, illipe, shed, palm, sal, soybean, cottonseed, palmkernel, coconut, rapeseed and sunflower with 5–57 parts by weight of water and 13–85 parts by weight of a mixture of thickeners selected from polydextrose and maltodextrin, and sweeteners so that the ratio:

$$\frac{\text{polydextrose} + \text{maltodextrin} + \text{sweetener}}{\text{water}} = 2-9$$

and subjecting the water-continuous emulsion thus obtained to cooling.

In the above compositions the acidity regulator (controller), the thickener, the bulking agent, the emulsifier, the sweetener, the flavour, the colorant, the humectant and the preservative that can be applied are the same as those laid down in EP 547,658. Therefore, the content of this EP 547,658 should be considered to be incorporated in this application.

A factor which has a positive contribution to the product performance is the use of a mixture of polydextrose and maltodextrin as the thickener. Therefore, these components are applied in amounts combined with the sweetener, if present, so that $$\frac{\text{polydextrose} + \text{maltodextrin} + \text{sweetener}}{\text{water}} = 2-9.$$

The type of polydextrose and maltodextrin that can be applied is the same as that disclosed in EP 547,658.

Aerated confectionery fillings can be obtained by incorporation of 1–35 vol% (on volume of the total filling) of an inert gas, such as $N_2$ or $N_2O$. Also solids of particular matter with a particle size between 0.1–200 μm, preferably 1–25 μm can be incorporated in our filings. Examples being: cocoa powder, $TiO_2$, colourants and opacifiers.

The process according to the invention can also be applied in the preparation of a low-fat spread. In that case, the remainder cannot be a sweet remainder. Accordingly, our invention also concerns a process for the preparation of a low-fat spread, wherein a low-fat spread is made by:

(1) mixing 10–30 parts of vegetable fat with 5–57, preferably 25–45 parts or water and 13–85 parts of a non-sweet remainder, (2) whereupon the water-continuous emulsion thus obtained, comprising 10–30 wt. % of fat, 5–57 wt. %, preferably 22–45 wt. % of water and 13–85 wt. % of non-sweet remainder, is cooled.

A clear benefit is obtained when the thickener is a non-gelling thickener, examples thereof being polydextrose, maltitol, lactitol, corn syrup, xanthan gum, non-gelling alginates, gum arabic, locust bean gum, cellulose-derivatives, derivatives, innulin (=fructose oligomers) and guar gum. However, also some sweeteners, such as sugar or humectants, such as glycerol can be applied as non-gelling thickener.

Depending on the N line of the fat applied, low-fat pastry spreads, low-fat wrapper spreads or low-fat cake emulsions can be made. The fats applied for each of these purposes have the following N lines:

pastry fat: $N_{20}=20–70$ wrapper spread: $N_{20}=17–45$; $N_{35}<8$
   cake emulsion: $N_{20}=15–35$
      $N_{30}=2–16$
      $N_{35}=0–10$
      $N_5–N_{15}=30–70$ Filled, encapsulated confectionery products, low-fat pastry spreads, low-fat wrapper spreads and low-fat cake emulsions made by using the fat emulsions according to the invention are also part of our invention.

EXAMPLE I

1. Preparation of a low-calorie filling composition

The following recipe was applied:

| | wt. % (calculated on total) |
|---|---|
| Aqueous phase | |
| Water | 6.6 |
| K-sorbate | 0.1 |
| Acidity regulator (controller) | 0.04 |
| High fructose corn syrup (71% solids) | 39.2 |
| Litesse ® (polydextrose) | 34 |
| Sub-total | 80 |
| Oil phase | |
| Emulsifier | 0.6 |
| Palm oil mid-fraction | 14.6 |
| Liquid vegetable oil with $N_{10}<7.0$ | 4.8 |
| Sub-total | 20 |

The above components were mixed at 60° C. A water-continuous fat emulsion with 18 wt % water, was obtained.

This warm emulsion was cooled, using two A units. Throughput was 65 kg/hr; residence times were 35 sec. in the first and 35 sec. in the second A unit. Consequently the residence time for the inversion was 70 sec. The emulsion was subjected to a shear or 195 $s^{-1}$ and 120 $s^{-1}$ in the two A units.

Exit temperatures were: A1: 25° C.; A2 20.5° C.

The amount of α-phase fat formed during cooling was 2%

The product displayed the following Stevens value (at 20° C.): after 1 day 350.

The Stevens value was measured by using a cylindrical probe travelling 10 mm at a rate of 1 mm/sec.

EXAMPLE II

The following recipe was applied:

| | wt % (on total) |
|---|---|
| Aq phase: | |
| water | 6.8 |
| K-sorbate | 0.1 |
| acidity regulator | 0.04 |
| high fructose corn syrup (71% solids) | 38.7 |
| polydextrose | 34 |
| colorant | 0.3 |
| Oil phase: | |
| emulsifier | 1.0 |
| palm oil mid fraction | 14.3 |
| liquid vegetable oil | 4.7 |

The process according to example I was followed, however, using a microrotator-system.

Throughput was 3.8 Kg/hr.

The residence-times were: 27.0 sec. in A1 and 27.0 sec. in A2.

The shears were: 356 $S^{-1}$ in A1 and 360 $S^{-1}$ in A2.

Exit temperatures: A1: 19° C.

A2: 15° C.

The amount of α-phase fat was: 5%

The product displayed a Stevens-value of 610 after 15 days.

We claim:

1. Process for the production of confectionery filling compositions displaying stability, fatty feeling and oral mouthfeel performance properties that meet the quality standards required by confectionery manufacturers comprising the steps of:

(1) forming a water-continuous fat emulsion having the composition;

10–30 wt. % of fat;

5–57 wt. % of water;

13–85 wt. % of remainder, being at least one compound selected from the group consisting of acidity controller, thickener, bulking agent, emulsifier, sweetener, flavour, colorant, humectant and preservative;

by mixing the components at a temperature above the melting point of the fat;

(2) cooling the emulsion obtained in step (1), while subjecting the emulsion to a shear of 100–800 $s^{-1}$ for a residence time of less than 2 minutes, while phase inversion occurs, and forms a fat-continuous low-fat emulsion as the confectionery filling composition, wherein the cooling conditions are such that no more than 20 wt. % of α-phase fat is formed.

2. Process according to claim 1, wherein step (2) is carried out by using one or more A units.

3. Process according to claim 1, wherein the mixing in step (1) is carried out at a temperature between 35° and 85° C.

4. Process according to claim 1, wherein a fat is applied having a melting point between 35° and 75° C.

5. Process according to claim 1, wherein the composition of the water-continuous emulsion in step (1) is set at:

15–25 wt. % of fat

15–40 wt. % of water balance remainder.

6. Process according to claim 1, wherein the fat applied is a fat containing at least 15 wt. % of behenic.

7. Process according to claim 1, wherein a fat-continuous emulsion if prepared, the fat phase of which has a solid content at 20° C. of at least 17 (NMR pulse, not stabilized).

8. Process according to claim 1, wherein a low-calorie confectionery filling-composition is prepared by mixing of 10–30 parts of a vegetable fat selected or derived from soft fractions of cocoa butter, illipe, shea, palm, sal, soybean, cottonseed, palmkernel, coconut, rapeseed and sunflower with 5–57 parts by weight of water and 13–85 parts by weight of a mixture of thickeners selected from polydextrose and maltodextrin, and sweeteners so that the ratio:

$$\frac{polydextrose + maltodextrin + sweetener}{water} = 2-9$$

and subjecting the water-continuous emulsion thus obtained to a cooling according to claim 1.

9. Filled, encapsulated confectionery products, wherein the filling comprises the product obtained according to the process of claim 1.

10. Process according to claim 1, wherein the thickener is a non-gelling thickener.

11. Process according to claim 1 wherein the residence time is in the range from 1–90 seconds.

* * * * *